United States Patent
Jäntti et al.

(10) Patent No.: US 9,088,910 B2
(45) Date of Patent: Jul. 21, 2015

(54) METHOD AND A SYSTEM FOR CONTROLLING THE AGGREGATE INTERFERENCE IN COGNITIVE RADIO NETWORKS

(75) Inventors: Riku Jäntti, Espoo (FI); Kalle Ruttik, Espoo (FI); Konstantinos Koufos, Helsinki (FI)

(73) Assignee: AALTO-KORKEAKOULUSÄÄTIÖ, Espoo (FI)

( * ) Notice: Subject to any disclaimer, the term of this patent is extended or adjusted under 35 U.S.C. 154(b) by 83 days.

(21) Appl. No.: 14/001,334

(22) PCT Filed: Feb. 24, 2012

(86) PCT No.: PCT/EP2012/053225
§ 371 (c)(1),
(2), (4) Date: Aug. 23, 2013

(87) PCT Pub. No.: WO2012/113937
PCT Pub. Date: Aug. 30, 2012

(65) Prior Publication Data
US 2013/0336155 A1      Dec. 19, 2013

Related U.S. Application Data

(60) Provisional application No. 61/446,070, filed on Feb. 24, 2011.

(51) Int. Cl.
*H04W 24/00* (2009.01)
*H04W 24/08* (2009.01)
*H04W 52/24* (2009.01)
*H04W 4/00* (2009.01)
*H04W 16/14* (2009.01)

(52) U.S. Cl.
CPC ............ *H04W 24/08* (2013.01); *H04W 52/244* (2013.01); *H04W 16/14* (2013.01)

(58) Field of Classification Search
CPC .... H04W 24/08; H04W 52/244; H04W 16/14
See application file for complete search history.

(56) References Cited

U.S. PATENT DOCUMENTS

| | | | | |
|---|---|---|---|---|
| 6,127,972 | A * | 10/2000 | Avidor et al. | 342/373 |
| 6,456,850 | B1 * | 9/2002 | Kim et al. | 455/453 |
| 7,522,877 | B1 * | 4/2009 | Avellan et al. | 455/12.1 |
| 7,729,657 | B1 * | 6/2010 | Avellan et al. | 455/12.1 |
| 8,238,817 | B1 * | 8/2012 | Avellan et al. | 455/12.1 |
| 2002/0109607 | A1 * | 8/2002 | Cumeralto et al. | 340/870.02 |

(Continued)

OTHER PUBLICATIONS

International Search Report in PCT Application, PCT/EP2012/053225, EPO, Apr. 16, 2012.

(Continued)

*Primary Examiner* — Clemence Han (57) ABSTRACT

A method for controlling the aggregate interference of a secondary system (10) in a cognitive radio network comprises the steps of computing the power density (Pd,i), footprint (Afoot,i) and service area (Ai) for each of the cells (100) of the secondary system (10) that satisfy the interference constraint at a given point (P) in a primary system (50); summing the power densities (Pd,i) for all cells (100) for the point (P); and using the sum of the power density at the point (P) to decide which power level a new secondary system (10) user is allowed to use in a given cell (100). A system for performing such a method is also disclosed.

15 Claims, 3 Drawing Sheets

(56) References Cited

U.S. PATENT DOCUMENTS

| | | | |
|---|---|---|---|
| 2006/0292990 A1* | 12/2006 | Karabinis et al. | 455/63.4 |
| 2008/0285477 A1* | 11/2008 | Kuroda et al. | 370/252 |
| 2009/0264142 A1* | 10/2009 | Sankar et al. | 455/501 |
| 2012/0122503 A1* | 5/2012 | Ma et al. | 455/501 |
| 2013/0003580 A1* | 1/2013 | Kovacs et al. | 370/252 |

OTHER PUBLICATIONS

International Preliminary Report on Patentability in PCT Application, PCT/EP2012/053225, EPO, May 3, 2013.

Yi Shi et al., Distributed Cross-Layer Optimization for Cognitive Radio Networks, IEEE Transactions on Vehicular Technology, vol. 59 No. 8, Oct. 2010, pp. 4058-4069.

Xuemin Hong et al., Interference Modeling of Cognitive Radio Networks, IEEE Vehicular Technology Conference, May 11, 2008, pp. 1851-1855, ISBN: 978-1-4244-1644-8.

Niels Hoven Anant Sahai, Power Scaling for Cognitive Radio, Wireless Networks, IEEE Communications and Mobile Computing Conference, Jun. 13, 2005, pp. 250-255, vol. 1, ISBN: 978-0-7803-9305-9.

Shankar N. S. et al., Analysis of Aggregated Interference at DTV Receivers in TV Bands, IEEE Cognitive Radio Oriented Wireless Networks and Communications, Crowncom 2008 $3^{rd}$ International Conference On, May 15, 2008, pp. 1-8, ISBN: 978-1-4244-2301-9.

Timmers M. et al., Accumulative Interference Modeling for Cognitive Radios with Distributed Channel Access, Cognitive Radio Oriented Wireless Networks and Communications, Crowncom 2008 $3^{rd}$ International Conference On, May 15, 2008, pp. 1-7, ISBN: 978-1-4244-2301-9.

* cited by examiner

METHOD AND A SYSTEM FOR CONTROLLING THE AGGREGATE INTERFERENCE IN COGNITIVE RADIO NETWORKS

TECHNICAL FIELD

The invention relates in general to wireless communication systems and in particular to interference control in such systems.

BACKGROUND INFORMATION

The secondary transmission in a television (hereinafter: TV) spectrum relies on interference control. Secondary users (hereinafter: SU) of the spectrum are not allowed to cause interference to the primary system beyond acceptable limits. A secondary user refers to a White Space Device (hereinafter: WSD). A system that comprises several WSD:s is called a secondary system.

The aggregate interference can be computed by summing the interfering power from each individual transmitter. Such summation assumes that we know the position of each transmitter. The Federal Communications Commission (hereinafter: FCC) has decided that the spectrum access on the TV whitespaces is to be based on geolocation database that stores the location of the secondary users. Also the Great Britain Office of Communications (hereinafter: OFCOM) is currently planning geolocation databases. The databases are likely to store the location information of the secondary system base stations. However, it may be problematic to provide accurate location of the secondary users.

Although the WSD:s can be equipped with Global Positioning System (hereinafter: GPS) receivers to localize themselves, the position information might not be available in indoor scenarios and dense urban deployments where the high rise buildings can shadow the path between the terminals and satellites. Also the task of computing the aggregate interference based on the exact position of all the secondary users is likely to be computationally demanding. A new method is needed to compute at one time the terminal locations change.

Hong et al. have found (in "Interference modeling of cognitive radio networks", X. Hong, C-X Wang, and J. Tompson, in IEEE VTC 2008-spring, pp. 1851-1855, 2010, XP031255885, ISBN: 978-1-4244-1644-8) that the position information can be disregarded if the transmitters' location are modelled as a random Poisson point process.

Yi Shi, Y. Thomas Hou, Huabei Zhou and Scott F. Midkiff have in their article "Distributed Cross-Layer Optimization for Cognitive Radio Networks", published in IEEE Transactions on Vehicular Technology, IEEE Service Center, Piscataway, N.J., US, vol. 59, no-8, pages 4058-4069, XP011349028, ISSN: 0018-9545, DOI: 10.11109/TVT.2010.2058875, disclosed the use of the protocol interference model. In this model, the footprint of the transmitter is described as the area where the transmitter generates interference.

The randomly located transmitter is characterized by its transmission power distribution. The aggregate interference is computed as a convolution of distributions. Unfortunately, if the user is located in an arbitrarily shaped area we have to compute the power distribution numerically.

An alternative approach is to compute the aggregate interference as an integral over the spatial power density emitted from the secondary deployment area as suggested by Hoven and Sahai (in "Power scaling for cognitive radio,", N. Hoven, A. Sahai, in International Conference on Wireless Networks, Communications and Mobile Computing, vol. 1, pp. 250-255, 2005) and Shankar and Cordeiro (in "Analysis of aggregated interference at DTV receivers in TV band,", S. Shankar, C. Cordeiro, in CrownCom 2008, IEEE, Singapore, pp. 1-6).

Unfortunately, the model proposed by Hoven and Sahai does not contain fading and it is evaluated only for infinite area. The method of Shankar and Cordeiro considers location of all transmitters. Consequently, the model proposed by Shankar and Cordeiro becomes computationally demanding if applied on a large secondary system coverage area.

Straight-forward application of the geolocation database approach or stochastic geometric approach leads to a centralized design in which one central administration will need to have access to full information and then compute the aggregate interference. If multiple entities are allowed to control the access to spectrum, then they must share full information on the secondary user powers and locations.

The use of geolocation databases with sharing of full information about the secondary user powers and locations is not only computationally challenging and difficult to administer but also likely to jeopardize the privacy of the secondary users since the location of a user may be deduced from the location of the terminal he or she is currently using. In addition, the handling of private information may be unacceptable in view of current or planned privacy legislation situation in some countries.

SUMMARY

An objective of the invention is to increase the flexibility of the controlling of the aggregate secondary system interference with which is meant the interference that is generated or caused by simultaneously transmitting WSD:s.

The invention features a method and a system that allows decentralized control of the aggregate secondary system interference. The method can be utilized by the spectrum management entities when making spectrum allocation decisions. The system preferably includes a computer system operating under control of appropriate computer software programmed to carry out the computational acts described by the method, and for displaying the results of the computation.

According to the present invention, a method for controlling the aggregate interference of a secondary system in a cognitive radio network comprises the steps of:

computing the power density, footprint and service area for each of the cells of the secondary system that satisfy the interference constraint at a given point in a primary system in such a manner that:

power density is computed as secondary transmitter density of the cell multiplied with secondary user power of the cell;

footprint is computed as inverse of the secondary transmitter density of the cell;

summing the power densities for all cells for the point weighted by aggregated link gain of secondary user coverage areas and shadow fading; and using the sum of the power density at the point to obtain the aggregate interference in order to decide which power level a new secondary system user (SU/WSD) is allowed to use in a given cell.

The invention also features a system for controlling the aggregate interference of a secondary system in a cognitive radio network utilizing means adapted to carry out the steps of any of the method claims.

The dependent patent claims describe various advantageous aspects of the method and of the system.

The invention discloses a method for controlling the aggregate interference of a secondary system in a cognitive radio network comprising the steps of:

computing the power density, footprint and service area for each of the cells of the secondary system that satisfy the interference constraint at a given point in a primary system, in such a manner that:

power density is computed as secondary transmitter density of the cell multiplied with secondary user power of the cell;

footprint is computed as inverse of the secondary transmitter density of the cell;

summing the power densities for all cells for the point weighted by aggregated link gain of secondary user coverage areas and shadow fading; and using the sum of the power density at the point to obtain the aggregate interference in order to decide which power level a new secondary system user is allowed to use in a given cell, the flexibility of the controlling of the aggregate secondary system interference can be increased, since now the problems associated with the Poisson distribution and with the integration as suggested by Hong et al, Hoven and Sahai, and Shankar and Cordeiro, respectively, can be avoided. It suffices to compute the power density for all cells and then use the power density in computation of the interference. With this method the power density-based computation can be carried out for an arbitrary secondary system area.

If the computing is performed locally in the cell, the flexibility of the controlling of the aggregate secondary system interference can be increased even more, since then it is not necessary to perform the computations in a central unit. This makes it easier to add new network units. An advantageous aspect is that in this manner, certain information about the cell and/or users does not need to transmitted to a central unit. In this manner, the privacy of the users may be better safeguarded.

If the power density, footprint and service area for each of the cells are stored in a database, the automated handling of these computed variables can be made easier.

In particular, if the database is a cell-specific database that is stored in the cell database, the privacy of the users may be safeguarded even better since there is no need to transmit user-specific information beyond the boundary of the cell or the cell-specific database.

If the power density, footprint and service area for each of the cells are stored in a database, it becomes possible to distribute the power density, footprint and service area between each of the databases. This may be used to increases the accuracy of the cell-specific power density computations.

The interference tolerance at some or all points P on the primary system coverage edge can be quantified and used as a resource. Consequently, this resource can be traded between different geolocation database operators or secondary networks.

BRIEF DESCRIPTION OF THE DRAWINGS

In the following, we describe the invention in more detail with reference to examples shown in the attached drawings in FIG. 1 to 5, of which.

Same reference numerals refer to similar technical elements in all figures.

DETAILED DESCRIPTION OF THE PREFERRED EMBODIMENTS

Figure 1:
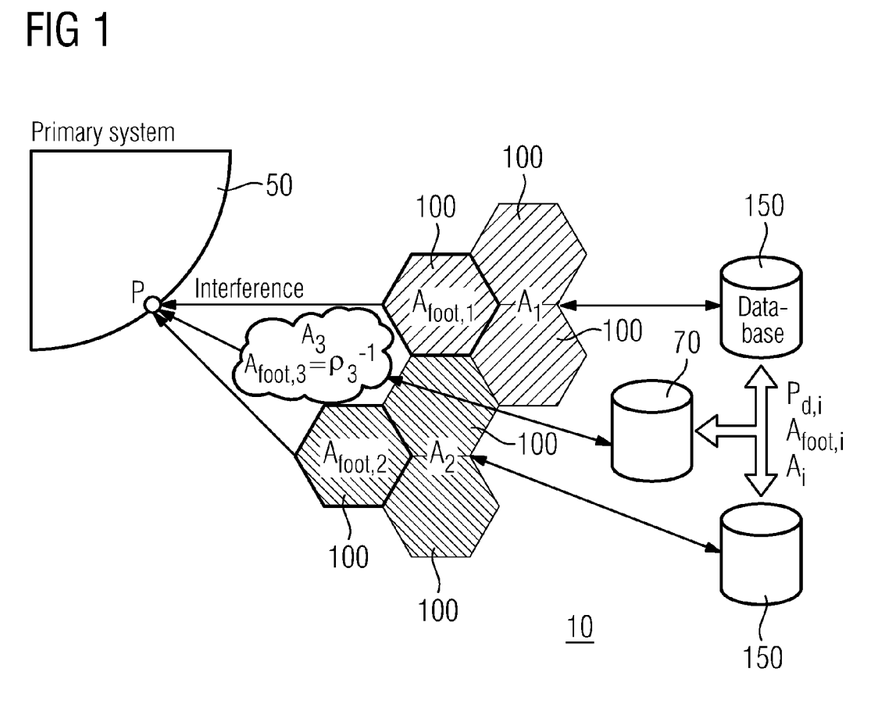
FIG. 1 illustrates a decentralized aggregate interference control system.

To prevent the primary TV system 50, FIG. 1 from suffering interference resulting from a number of secondary system 10 cells 100, the present invention proposes the following method and system for controlling the aggregate interference in a cognitive radio network. The term "cell" refers to a service area of a single or multiple WSD:s. The central unit can be e.g. a geolocation database.

The aggregate interference statistics (all its moments) at a given point P can be estimated locally based on a few simple parameters that each secondary network needs to provide. The required parameters from each secondary system cell 100 (for each i $\in$ SU) are Coverage area $A_i$ of the secondary system cell 100;

Footprint (area) $A_{foot,i}$ [m$^2$] of the secondary system cell 100 (service area) or secondary transmitter density $\rho_i$ [number of transmitters/m$^2$]. These two parameters are related to each other through relation $$A_{foot,i} = \rho_i^{-1} \quad (1)$$

Power density $P_{d,i}$ of the secondary system cell 100\

$$P_{d,i} = P_{SU,i}/A_{foot,i} = \rho_i P_{SU,i} \quad (2)$$

or any function of these parameters.

Figure 2:
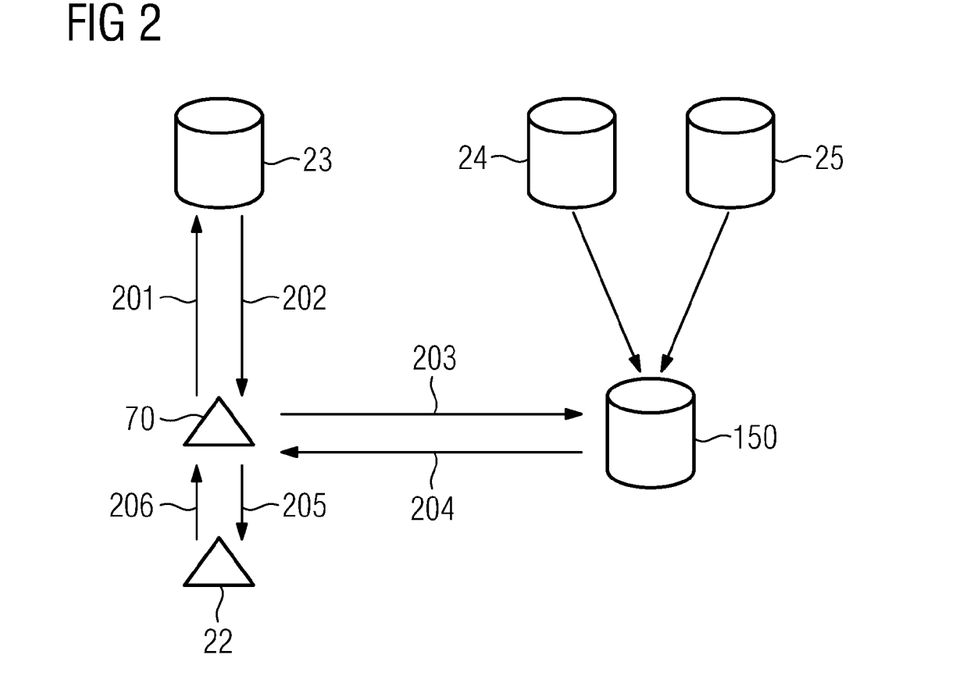
FIG. 2 illustrates an operation principle of a geo-location database.

In addition, the system 70, FIG. 2 for controlling the aggregate interference needs to know the overall area A of all cells 100 and the coverage area $A_i$ of each secondary system cell 100. In addition, what is needed is:

The moments of the aggregated link gain between the SU coverage area $A_i$ and point P in the PU coverage area $$\int_{A_i} g_a^m da \quad (3).$$

Moments of the shadow fading $$E\{x^m\} \quad (4).$$

These can be either computed based on some calibrated pathloss and shadow fading model, empirical pathloss measurements or detailed terrain model.

Let $A_i$ denote the service area of the i:th SU system cell 100, so that $A_{foot,i}$ denotes its footprint (cell size) and $P_{d,i}$ denotes its power density. Now the two first moments of the aggregate interference at point P can be described as $$E(I_P) = \Sigma_i P_{d,i} E\{x_i\} \int_{A_i} g_a da \quad (5).$$

According to the point process model we get $$E\{I_P^2\} = \Sigma_i [P_{d,i}^2 E\{x_i^2\} A_{foot,i} \int_{A_i} g_a^2 da + (P_{d,i} E\{x_i\} \int_{A_i} g_a da)^2] \quad (6)$$

And according to the cellular SU system model we get $$E\{I_P^2\} = \Sigma_i [P_{d,i}^2 E\{(x_i - E\{x_i\})^2\} \int_{A_{foot,i}} g_a^2 da + (P_{d,i} E\{x_i\} \int_{A_i} g_a da)^2] \quad (7)$$

Similarly, we can compute the higher moments.

The first moment $E\{I_P\}$ depends on the power density $P_{d,i}$ only. The second moment $E\{I_P^2\}$ (as well as the higher moments) depends in addition to the power density $P_{d,i}$ also on the footprint $A_{foot,i}$.

The parameter x denotes the shadow fading which in the above equations are assumed as independent, but the model can be easily extended to the correlated case. It is worth noting that the second moment depends on the utilized SU system characteristics i.e. whether the SU system is a cellular system or an ad hoc type of system. The moments are in most practical cases almost equal as the variance and second moment of the log-normal shadow fading are close to each other. The point process provides an upper bound for the interference whereas the cellular model provides the lower bound.

There are several ways that the interference statistics may be then utilized to control the aggregate interference. The simplest case is to use only the first order statistics and provide conditions for the SINR assuming a fixed link gain.

$$SINR_p = \frac{g_{PU,p} P_{PU}}{E\{I_{PU}\} + I_{PU,p} + \sigma^2} \geq SINR_{threshold} \qquad (8)$$

where $g_{PU,p}$ is the mean link gain between the PU transmitter and point P, $I_{PU,p}$ is the PU self-interference and $\sigma^2$ is the noise power.

It is more accurate to treat the PU SINR as a random variable $$Pr\left\{\frac{g_{PU,p} P_{PU}}{I_p + I_{PU,p} + \sigma^2} < SINR_{threshold}\right\} < \varepsilon. \qquad (9)$$

The Wilkinson model suggests that we model the signal-to-noise ratio (hereinafter: SINR) as log-normal random variable and match the first two moments. With this technique we can bind the primary system outage probability.

The basic operation principle for spectrum access is to compute whether the primary system protection can be maintained when a new SU system is added. Alternatively, it may be possible to compute the power density that the new SU user is allowed to use in a given area.

The proposed aggregate interference control methodology allows a decentralized spectrum access management where only the secondary systems need to specify their coverage area and power density and the local spectrum manager entities 150 need only to exchange power density $P_{d,i}$ and service area $A_i$ information. The aggregated pathloss values can be pre-determined resulting very low computation burden and allowing real-time operation.

For each of the secondary system cells 100, the power density $P_{d,i}$, footprint $A_{foot,i}$ and service area $A_i$ for all secondary system cells 100 are stored in a database 150 that is pertinent for each cell 100, such as, that is stored in the cell 100 database.

The proposed scheme should be part of cognitive radio standards that should specify the required primary system protection criteria and the information that need to be exchanged between the systems.

The same principle could be extended to any wireless system as part of interference control and network optimization procedures. Also application to network planning tools is possible.

The following describes how the invention can be used in connection with a geo-location database.

FCC and OFCOM have proposed the use of geo-location database to control the access of secondary users to TV white space. Geo-location database is also been outlined in FCC draft report 159. In this approach, cognitive devices measure their location and consult a geo-location database to determine which frequencies they can use at their location (i.e. the location which they have indicated to the database).

In the current FCC approach [FCC, Second memorandum opinion and order in the matter of unlicensed operation in the TV broadcast bands (ET Docket No 04-186), Additional Spectrum for unlicensed devices below 900 MHZ and in 3 GHZ band (EC Docket No 02-380), 23 Sep. 2010], the white space devices (WSDs) are allowed to use fixed transmission power when they are outside the coverage and protection area of a TV transmitter.

The ECC 159 approach (ECC Report 159,"Technical and operational requirement for the possible operation of cognitive radio systems in "White Spaces" of the frequency band 470-790 MHZ", January 2011) is to compute the available transmission power based on the WSD location. For given channel, the ECC 159 approach divides the area outside the coverage area of the TV transmitter into pixels and then computes the power available power for each pixel.

Neither the FCC approach nor ECC 159 rule model the impact of aggregate interference of multiple simultaneously transmitting WSDs to the primary receiver. In case of FCC rule, the protection distance provides some tolerance against aggregate interference but it cannot guarantee the protection of primary receivers in all cases. The ECC approach suggest the use of multiple secondary margin (MI) to take into account the aggregated interference from multiple (co-channel and adjacent channel) WSDs operating in a given area at the same time. The report 159 specifies MI for 2, 3 and 4 simultaneous interfering transmitters (interferers).

No method is provided to determine the margin in case very large number of WSDs share the given channel. It has been illustrated in Jäntti et. al. 2011 [in "Aggregate interference with FCC and FCC white space usage rules: case study in Finland,", R. Jäntti, J. Kerttula, K. Koufos, and K. Ruttik IEEE DySPAN 2011, Aachen, Germany, May 2011] that both FCC and ECC 159 rules fail to protect the primary TV receivers in case of large scale country wide deployment of WSD networks.

Implementation of a geo-location database has been described e.g. in OFCOM consultation 9 Nov. 2010 [OFCOM, Implementing geolocation: consultation, publication date 9 Nov. 2010].

The system consist of several databases. The regulator has list of third party provided geo-location databases. These third geo-location party databases control the access to the TV white space. There are separate databases 24, 25 that contain information on Digital Terrestrial Television (DTT) coverage and Program Making and Special Events (PMSE) device usage. The geo-location database 150 uses these separate databases 24, 25 to determine which channels are available in the given location of the WSD trying to access the spectrum.

The operation principle outlined by OFCOM is as follows as shown in FIG. 2:

1. The master WSD device 70 contacts (request 201) a website 23 maintained by regulator or similar body which in turn responds with a list of the geo-location databases (response 202).

2. The master WSD device 70 then decides which of these geolocation databases it consults (if there is more than one). The master WSD device 70 sends (message 203) to its selected database 150 as a minimum:

Its location provided in terms of a latitude-longitude positional fix.

Its determination as to the accuracy of that location to a 95% certainty provided in meters.

Its model type provided in terms of manufacturer and model number.

Its height above ground level if it is a fixed terminal mounted on a mast or similar.

3. The geo-location database 150 provides by way of a response 204 a set of available frequencies in the master WSD's 70 area, each of which includes the following:

The start and stop frequency for the channel.

The allowed power level for using the channel.

The channel validity time (i.e. the time that the device is allowed to use the channel before having to re-check with the database).

4. The master WSD 70 may then signal allowed frequencies and power levels to any WSD slave device 22 on its selected channels (message 205) and the WSD slave device 22 can respond with confirmation or data (confirmation 206).

With the use of our invention the situation of protecting DTT receivers against aggregate interference from large number of simultaneously transmitting secondary WSD transmitters can be solved. In addition, the flexibility of the geo-location database 150 system 70 by allowing hierarchical operation can be increased. Furthermore, cooperation of the geolocation databases 150 may be facilitated by means of simple set of parameters.

In the method for controlling the aggregate interference of a secondary system 10 in a cognitive radio network 500, the transmit power is allocated (response 204 and message 205) to slave WSDs 22 so that protection of the primary system 50 can be guaranteed.

The method can be utilized by the spectrum management entities (Master WSD 70 and Geo-location data-base 150) when allocating channels and determining the allowed power level for slave WSDs 22. The proposed method also provides means for multiple geo-location databases to jointly control the aggregated interference towards the TV receivers. It also allows decentralization of Geo-location database operation.

The present invention also features a method for controlling aggregate secondary system interference. The method can be utilized by the spectrum management entities when making spectrum allocation decisions.

Figure 3:
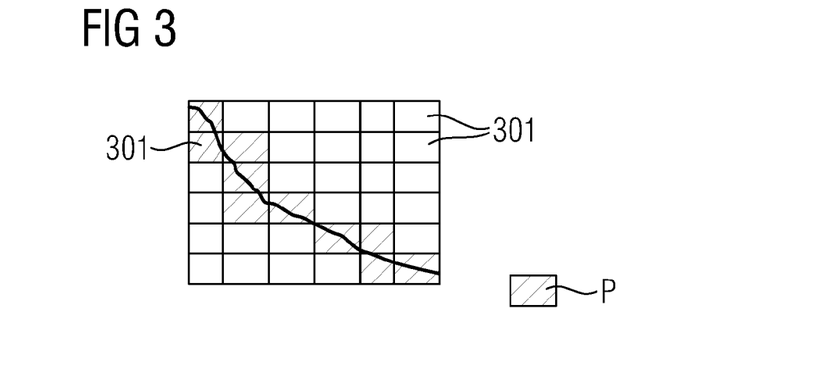
FIG. 3 illustrates test points at the broadcast coverage edge.

The method for controlling the aggregate interference of a secondary system in a cognitive radio network comprises the steps of Evaluation of the amount of interference $IA_p$ that can be added at each test point 301 (denoted by P in the equations) in the TV coverage area (see also FIG. 3). This amount of interference is further called as the interference margin which is illustrated in more detail in FIG. 4.

The method handles the interference margin as the resource that is distributed among the secondary users.

Secondary users are treated as single entities (e.g. the Master WSD 70 in FIG. 2) or the set of users covering certain area (e.g. set of slave WSD 22 controlled by single Master WSD 70).

In the case of single WSD, the available interference resource is allocated to the user.

In the case of a WSD network covering an area, the resource is allocated to the area (response 204) that is controlled by the master WSD.

The interference from all the users in the areas should be less or equal than the amount of interference resource allocated to the area.

The Sum of all the allocated interference margins should be less or equal to the total interference increase at each TV test points.

The Radio Resource Management Entity 70 of the WSD network is responsible for controlling the power in its network (message 205).

Instead of describing the individual power of each transmitter the interference from the area is described by the power density in the area.

Based on the power density, the method can compute the interference level generated from the area.

Power density allows the method to ignore the location and transmission power of each individual transmitter in the considered area.

In order to satisfy the interference margin the RRM entity 70 can convert the power density to allowed transmission powers of each transmitter.

The central resource allocation database does not need to allocate the power level for each transmitter. The power level of the transmitter is automatically following from the allocated the power density level and the footprint of the transmitter.

The Footprint of the transmitter is the coverage area of the transmitter.

In the case of randomly located transmitter, like femto-cell or WLAN type network, the footprint is computed as the number of transmitters divided by the total area where the transmitters are considered.

In the case of cellular system the footprint is the reuse area of the cell.

Figure 4:
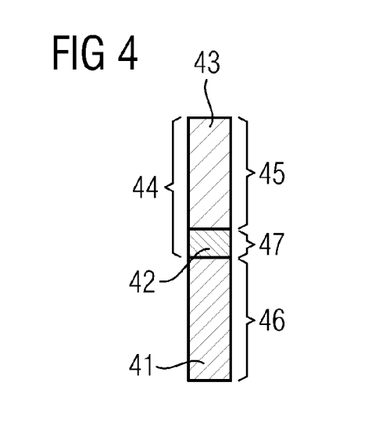
FIG. 4 illustrates the interference margin at one test point.
Figure 5:
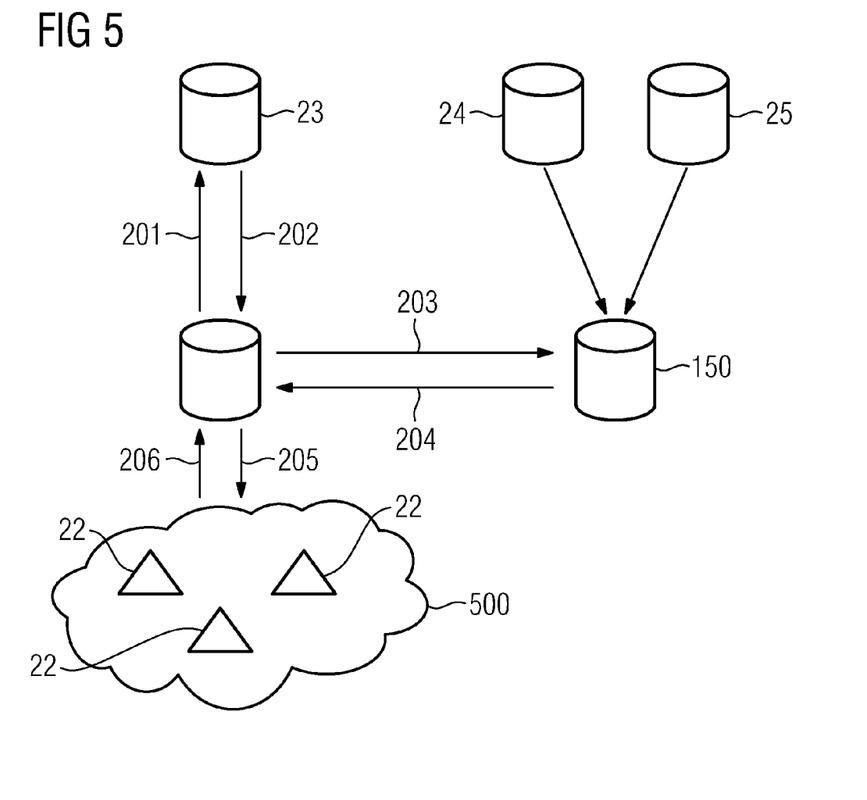
FIG. 5 illustrates geo-location database operation principle in case of allocating power densities to networks or areas instead of controlling individual WSD:s.

FIG. 4 illustrates interference margin at one test point (pixel) P. In FIG. 4, interference+noise signal is denoted by 41, the interference headroom is denoted by 42, TV signal level is denoted by 43, the current signal-to-noise+interference ratio (SINR) level is denoted by 44, the target SINR level is denoted by 45, the current interference and noise level is denoted by 46 and the interference margin is denoted by 47.

The system controlling the aggregate interference of a secondary system in cognitive radio network comprises means adapted to carry out the steps of any of the methods and method claims set forth herein.

The interference controlling system can either allocate the interference margins or the power density in the area. In the first case, the RRM entity controlling the area can compute the corresponding power densities and allowed WSD transmission powers. The RRM entity controlling particular area or WSD network is responsible to guarantee that aggregate interference from all its transmitters does not exceed the allocate interference level.

The system can also operate in centralized mode, in which central Geo-location database does all the computations locally. In that case, the power density method can be applied to reduce the number of required computations needed to determine the power allocations that guarantee DTT protection against aggregate interference from multiple WSDs.

In centralized mode, the multiple geo-location databases need to Inform other geo-location databases on the share of the interference margin or the power densities they are using (or any other information based on which these can be deduced). This information is necessary to guarantee DTT receiver protection against the aggregate interference.

The current document describes the method that allows the present invention to compute the interference level from the power density or vice versa given power density to allocate the powers to individual transmitters.

The proposed method allows spectrum usage decisions to be distributed while still controlling the aggregate interference to the incumbent spectrum (DTT and PMSE) users.

The decision is proposed to be done either at the interference margin level or at the power density level. Such approaches minimize the communication requirements among the spectrum users. The spectrum usage is characterized by few simple parameters that are easy to communicate among the users.

The use of geolocation databases with sharing of full information about the secondary user powers and locations is not only computationally challenging and difficult to administer but also likely to jeopardize the privacy of the secondary users since the location of a user may be deduced from the location of the terminal he or she is currently using. In addition, the handling of private information may be inacceptable in view of current or planned privacy legislation situation in some countries. The proposed method allows hierarchical operation in which the exact locations of the WSDs do not have to be known by the central geo-location database.

The location information can be kept inside the radio resource management entity of the WSD network.

If the resources are allocated as the shares of the interference margins the spectrum usage case can be decided locally. For instance the spectrum can be used by multiple networks where each of them is allocated a share of the interference margin. The interference margin decouples the networks and different networks do not have to know the spectrum usage patterns of each other.

The interference margin could be a simple trading object that can be traded between the geo-location databases and/or WSD networks. For instance in this case the spectrum usage is controlled by multiple geo-location databases. Each of them is allocated a share of the interference margin. If one database would like to admit more secondary transmitters than its interference margin allows it could trade the additional margin from some other geo-location database. The power density provides similar information to the interference margin. Instead of sending the interference margin information the central allocation unit pre-computes the power density the secondary transmitters could use and communicates that information to the secondary system (message 204 in FIG. 2).

A benefit of this more elaborate approach is that it provides more simple interference control. It is easier for the secondary transmitters to control the power density level than to evaluate whether they all meet the interference margin requirement.

Given the power density the transmission power of the transmitter is simply computed by integrating the power density over the footprint of the transmitter. In a cellular system the footprint of the transmitter is the coverage area of the transmitter, in case of frequency reuse one, or the coverage area of the frequency reuse, in case of the frequency reuse more than one.

In case of randomly located transmitters the footprint is computed as the amount of active transmitters dived by the area spanned by the transmitters.

The operation of TV receivers is considered to be satisfactory if a target SINR $\gamma_t$ is satisfied with specific location probability q due to the slow fading:

$$Pr\left(\frac{S}{I} \leq \gamma_t\right) \leq 1-q \Rightarrow Pr\left(S^{(dB)} - I^{(dB)} \leq \gamma_t^{(dB)}\right) \leq 1-q. \quad (10)$$

Starting from (10) one can derive the maximum allowable mean generated interference increase that does not violate the operation of TV receivers:

$$E\{I^{(dB)}\} \leq E\{S^{(dB)}\} - \gamma_t^{(dB)} + x_q \sqrt{\text{var}\{S^{(dB)}\} + \text{var}\{I^{(dB)}\}} \overset{def}{=} I_\Delta^{(dB)} \quad (11)$$

where $I_\Delta^{(dB)}$ referred to as the interference margin.

If $S^{(dB)}$ and $I^{(dB)}$ are approximated with Gaussian distributions then $x_q = Q^{-1}(1-q)$ is the q-quantile of a standard Gaussian distribution.

The Gaussian approximation for the aggregate interference distribution was shown to be valid when the inter-distances between the interferers are small compared to the distances between the interferers and the TV test points, as suggested in "Near vs far field: interference aggregation in TV white spaces" by K. Woyach et al., in Proc. IEEE Globecom 2011.

The Cornish-Fischer expansion can be utilized to find solution of the form of (11) even if the distributions of $S^{(dB)}$ and $I^{(dB)}$ are not Gaussian. In such case $x_q$ becomes function of the q-quantiles of the standard Gaussian and the cumulants of $S^{(dB)}$ and $I^{(dB)}$. The bound for interference that guarantees primary system protection can also be derived by using Monte Carlo simulation as suggested in ECC Report 159 and document "Interference potential vs power density for the WSD co-channel aggregated EIRP limitation", SE43(11)42, September 2011 (hereinafter: SE43(11)42).

The nuisance parameters not directly expressed in (11) like antenna discrimination, polarization and gain can be incorporated into the calculation of the interference margin through some additional parameter M:

$$E\{I^{(dB)}\} \leq E\{S^{(dB)}\} - \gamma_t^{(dB)} + x_q \sqrt{\text{var}\{S^{(dB)}\} + \text{var}\{I^{(dB)}\}} + M \overset{def}{=} I_\Delta^{(dB)}. \quad (12)$$

The interference margin describe the maximum allowable mean interference generated at the TV receivers. In simple case of co-channel interference, the median nuisance field is calculated as in SE43(11)42:

$$E\{I^{(dB)}\} \propto E_w - PR_{co} + M$$

where $E_w$ is the wanted signal strength and $PR_{co}$ is the co-channel protection ratio. This is similar to (12) while the variance of the aggregate interference $\text{var}\{I^{(dB)}\}$ will be computed from the simulations.

It should be noted that the upper bound on the mean aggregate interference in the log-domain $E\{I^{(dB)}\} \leq I_\Delta^{(dB)}$ also sets a limit for $E\{I\}$ which is a linear function of the mean received power from the different WSD. For instance, in case of lognormal approximation for the distribution of the aggregate interference, we have (as suggested "Modeling of the secondary system's generated interference and studying of its impact on the secondary system design,", K. Ruttik, K. Koufos, and R. Jäntti, Radioengineering, Vol. 19, No. 4, pp. 488-493, December 2010):

$$E\{I\} \leq \exp\left(\frac{1}{\xi} \cdot \left(I_\Delta^{(dB)} + \frac{1}{2\xi}\text{var}\{I^{(dB)}\}\right)\right) \overset{def}{=} I_{\Delta,p}$$

where $\xi = 10/\ln 10$ is a scaling constant.

The condition (12) must be satisfied for all the points belonging to the TV coverage area (also known as TV test points). Note that the available margin can be different at different test points because the useful TV signal level S is different.

The interference margin or equivalently, the total median nuisance field can be treated as an available resource. For a certain test point p, each active WSD is allowed to take a bite out of the total available margin:

$$E\{I_p\} = \sum_{i=1}^{N} g_{ip} \cdot P_i \le I_{\Delta,p}. \qquad (13)$$

where N is the total number of WSD, $P_i$ is the transmission power level for the ith WSD and $g_{ip}$ denotes the propagation pathloss between the ith WSD and the p:th protection point.

Equation (13) Implies that for successful interference control the database 150 has to know the precise location and transmission power level for each individual WSD. If the number of WSD is very large and their locations and activity change often, direct utilization of the bound Equation (13) can become computationally intensive task. Furthermore, Equation (13) assumes that a single database needs to have full knowledge of the entire WSD population. In order to allow distributed operation and faster computations, we propose to group the WSD having similar propagation conditions to the TV protection contour.

Let us assume that the WSD deployment area is split into K areas and $N_k$ denotes the number of active WSD belonging to the k:th area.

Alternatively, we can consider a case in which there are K WSD networks and there is $N_k$ WSDs in network k.

The generated interference at the p:th test point is:

$$I_p = \sum_{i=1}^{N} P_i \cdot g_{ip} = \sum_{k=1}^{K} \sum_{i=1}^{N_k} P_k \cdot g_{ip} \qquad (14)$$

where $P_k$ is the transmission power level for the WSD belonging to the kth area.

The WSD can be grouped based on the similarity of the power levels and channel attenuations. The area covered by a group is described by the approximately uniform power density level $P_{d_k} = P_k/A_k$ where $A_k$ stands for the area size. By using the power density instead of the transmission power level in (14) the generated interference can be read as:

$$\begin{aligned}
I_p &= \sum_{i=1}^{N} P_i \cdot g_{ip} \\
&= \sum_{k=1}^{K} \sum_{i=1}^{N_k} P_{d_k} \cdot A_k \cdot g_{ip} \\
&= \sum_{k=1}^{K} P_{d_k} \cdot \int_{A_k} g_{kp} \, dA_k \\
&= \sum_{k=1}^{K} P_{d_k} \cdot G_{kp}
\end{aligned} \qquad (15)$$

where the $$G_{kp} = \int_{A_k} g_{kp} \, dA_k$$

denotes the propagation loss between area k and the protection point p.

Equation (15) indicates that the allocation of transmission power levels to the WSD inside a certain area $A_k$ can vary as long as the power density emitted from the area is controlled.

The database 150 can delegate the interference control to different areas simply by allocating in each area a fraction of the interference margin $I_{\Delta_k}$ such that:

$$\sum_{k=1}^{K} I_{\Delta_k} = I_\Delta \qquad (16)$$

Inside an area the allocated interference margin $I_{\Delta_k}$ can be taken by few high-powered WSD or many low-powered WSD. E.g. small number of base stations or large number of user equipment.

The operation of the system can be summarizes as follows:
1. Interference margin $I_{\Delta,p}$ is determined for each pixel on the coverage contour of the DTT transmitter
2. The geo-location data-base can allocate the power to WSDs as long as the linear constraint Equation (13) is met. The allowed power could e.g. be determined by maximizing some utility function u of the power levels.

$$\max_P \sum_{i=}^{N} u(P_i)$$

s.t.

$$\sum_{i=1}^{N} g_{ip} \cdot P_i \le I_{\Delta,p}$$

or by some other means as long as Equation (13) holds.
3. If there are multiple geo-location databases then database k can allocate the powers as long as the total interference caused by the WSDs controlled by it does not exceed the fraction $I_{\Delta_k}$ of the interference margin. The databases need to know each other's interference margins such that Equation (16) can be enforced. Alternatively they need to know all the power levels allocated to individual WSDs.
4. The geolocation databases can trade the fractions of the interference margins they own or there could be separate brokerage entity.
5. If the number of WSDs is large, then the computation at the geo-location database can be speed up by grouping the users having similar propagation characteristics. Power densities are first computed for each area e.g. by maximizing some utility function v and then individual powers for WSDs can be determined.

$$\max_{P_d} \sum_{i=}^{N} v(P_{d_k})$$

s.t.

$$\sum_{k=1}^{K} P_{d_k} \cdot G_{kp} \le I_{\Delta,p}$$

or by some other means as long as Equation (15) holds. Multiple geo-location databases can coordinate their operation either by exchanging the interference margins or the power densities and footprints.

6. The operation of interference control can be divided between geo-location database and WSD networks such that the geolocation database allocates power densities to the networks and the RRM entity of the network then determine the available power for WSDs.

The preferred embodiment of the method according to the present invention can be summarized as follows:

The method of controlling the aggregate interference from a secondary system (WSD networks) in a cognitive radio network comprises the steps of:
  a) Evaluating the additional interference, interference margin, that can be generated at each primary system (DTT) test point.
  b) Allocating the fraction of the interference margin to the secondary transmitter, or to a secondary system.
  c) Communicating the allocated margin to the secondary transmitter, either
    c1) as the actual fraction of the interference margin the secondary system should satisfy at each primary system test point
    or
    c2) as the power density the secondary system can use in its service area, in which case the secondary system most preferably has to inform its service area to the geolocation database which then computes the allowed power density and feeds it back to the secondary system.

According to an advantageous aspect of this method, the aggregate interference to primary system 50 is controlled by multiple databases 150. Each database 150 is allocated a fraction of the interference margin. Such fraction is given for each primary system test point P.

In a further advantageous embodiment, in addition to or instead of any of the above mentioned advantageous aspect, a fraction of the interference margin $I_{\Delta,k}$ is allocated to each database (150). The database (150) is said to possess the allocated interference margin $I_{\Delta,k}$. A geolocation database can sell either the whole fraction $I_{D,k}$ allocated to it or some sub-fraction of it $I_{\Delta,k,s} < I_{\Delta,k}$. Similarly, a database (150) can buy either the whole fraction $I_{D,k}$ or some sub-fraction of it $I_{\Delta,k,s} < I_{\Delta,k}$.

In a further advantageous embodiment, in addition to or instead of any of the above mentioned advantageous aspects, one of the geolocation databases 150 can be configured as a centralized database and/or an additional brokerage function can be set up to allocate to the secondary system (another geolocation database, radio resource management entity of a WSD network or a master WSD 70) a sub fraction of the interference margin the database 150 owns. Such sub fraction is allocated at each test point P. The information of the sub fractions in each of the test points P is sent to the secondary system 10.

In a further advantageous embodiment, in addition to or instead of any of the above mentioned advantageous aspects, the secondary system considers the allocation interference margins and computes the allowed transmission power for each transmitter at its control.

In a further advantageous embodiment, in addition to or instead of any of the above mentioned advantageous aspects, the central database allocates the interference margins and computes the power density the secondary system can use. The computed power density is transmitted to the secondary system 50.

In a further advantageous embodiment, in addition to or instead of any of the above mentioned advantageous aspects, the secondary system 10 gets information of the power density per area it can emit. Secondary system 10 allocates the transmission power for each of its transmitters by considering the footprint of each particular transmitter.

Since any or all of these methods is most preferably carried out in a system, we have also Invented a system for controlling the aggregate interference of a secondary system in a cognitive radio network, comprising means adapted to carry out the steps of any of the method described above and/or any of its above mentioned advantageous aspects.

The invention is not to be understood to be limited in the attached patent claims but must be understood to encompass all their legal equivalents.

Modifications and substitutions by one of ordinary skill in the art are considered to be within the scope of the present invention, which is not to be limited except by the allowed claims and their legal equivalents.

The invention claimed is:

1. A computerized method for computing an aggregate interference of a secondary system (10) in a radio network and for displaying the results of said computation to a user in order to allow for controlling the aggregate interference of said secondary system, the method comprising the steps of:
  computing, by a pre-programmed computational device, a power density ($P_{d,i}$), a footprint ($A_{foot,i}$) and a service area ($A_i$) for each of a plurality of cells (100) of the secondary system (10) that satisfy an interference constraint at a given point (P) in a primary system (50), said computing performed in such a manner that:
    said power density ($P_{d,i}$) is computed as a secondary transmitter density ($\rho_i$) for each of said plurality of cells (100) multiplied with a secondary user power ($P_{SU,i}$) of each corresponding respective cell (100); and
    said footprint ($A_{foot,i}$) is computed as an inverse of the secondary transmitter density ($\rho_i$) for each of said plurality of cells (100);
  responsive to computing said power density ($P_{d,i}$) for each of said plurality of cells (100), said computational device summing the power densities ($P_{d,i}$) for all said plurality of cells (100) for the point (P) weighted by an aggregated link gain ($\int_A g_a^m da$) of secondary user (SU) coverage areas ($A_i$) and shadow fading ($E\{x^m\}$); and
  using the sum of the power density at the point (P) to compute an aggregate interference in order to display which power level a new secondary system (10) is allowed to use in a given cell (100).

2. The method according to claim 1, wherein the computing by the computational device is performed locally in the given cell (100).

3. The method according to claim 1, wherein the computed power density ($P_{d,i}$), footprint ($A_{foot,i}$) and service area ($A_i$) for each of the cells (100) are stored in a database (150) by said computational device.

4. The method according to claim 3, wherein the database (150) is a cell (100) specific database that is stored in a cell (100).

5. The method according to claim 3, wherein the computed power density ($P_{d,i}$), footprint ($A_{foot,i}$) and service area ($A_i$) are distributed between a plurality of databases (150).

6. The method according to claim 1, wherein:
  an interference margin is computed as an amount of additional interference ($I_{\Delta,p}$) that can be added at each test point (301, P) or at each primary system (DTT, 50) test point (P); and
  wherein said computational device allocates a fraction of the computed interference margin to said secondary transmitter and/or to a secondary system.

7. The method according to claim 6, wherein the allocated fraction is computed as the interference margin ($I_{A,p}$) that the secondary system (10) should satisfy at each primary system (50) test point (P).

8. The method according to claim 7, wherein an aggregate interference to said primary system (50) is retrieved from multiple databases (150) for computing spectrum access, and wherein each of said multiple databases are allocated a fraction of the interference margin ($I_{A,p}$), most advantageously for each primary system (50) test point (P).

9. The method according to claim 8, wherein the multiple databases (150) that are used to compute spectrum access are configured to trade the fractions of the interference margins ($I_{A,p}$) that said multiple databases (150) possess.

10. The method according to claim 9, wherein a central geolocation database (150) is configured to allocate to the secondary system (10) a sub-fraction of the fraction of the interference margin ($I_{A,p}$) contained in a given database (150), most advantageously for each primary system (50) test point (P).

11. The method according to claim 10, wherein the secondary system (10) is configured to allocate fractions of the interference margins ($I_{A,p}$) and compute an allowed transmission power for each transmitter (22) that said secondary system (10) controls.

12. The method according to claim 6, wherein the allocated fraction is computed as a power density ($P_{d,i}$) that the secondary system (10) can use in a service area ($A_i$).

13. The method according to claim 6, wherein a central database (150) is configured to allocate the interference margins ($I_{A,p}$) and compute the power density ($P_{d,i}$) that a secondary system (10) may use.

14. The method according to claim 6, wherein the secondary system (10) is configured to receive information of a power density ($P_{d,i}$) per area that said secondary system (10) can emit, and wherein the secondary system (10) is also configured to allocate a transmission power for each of said secondary system's (10) transmitters (22) by comparing the footprint ($A_{foot,i}$) of each particular transmitter (22).

15. A system (70) for controlling an aggregate interference of a secondary system (10) in a cognitive radio network, said system comprising:
   a pre-programmed computational device, configured for computing the aggregate interference of said secondary system (10) in said cognitive radio network and responsive to results of said computation, for controlling the aggregate interference of said secondary system, said computational device preprogrammed for:
   computing a power density ($P_{d,i}$), a footprint ($A_{foot,i}$) and a service area ($A_i$) for each of a plurality of cells (100) of the secondary system (10) that satisfy an interference constraint at a given point (P) in a primary system (50), said computing performed in such a manner that:
      said power density ($P_{d,i}$) is computed as a secondary transmitter density ($\rho_i$) for each of said plurality of cells (100) multiplied with a secondary user power ($P_{SU,i}$) of each corresponding respective cell (100); and
      said footprint ($A_{foot,i}$) is computed as an inverse of the secondary transmitter density ($\rho_i$) for each of said plurality of cells (100);
   responsive to computing said power density ($P_{d,i}$) for each of said plurality of cells (100), said computational device summing the power densities ($P_{d,i}$) for all said plurality of cells (100) for the point (P) weighted by an aggregated link gain ($\int_A g_a^m da$) of secondary user (SU) coverage areas ($A_i$) and shadow fading ($E\{x^m\}$); and
   said computational device using the sum of the power density at the point (P) to compute an aggregate interference in order to display which power level a new secondary system (10) is allowed to use in a given cell (100).

* * * * *